May 29, 1945.  D. R. WINSLOW  2,377,198
CHILD'S FOLDING VEHICLE
Filed Nov. 11, 1944
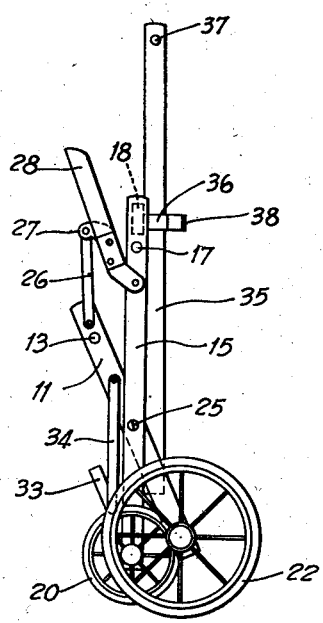
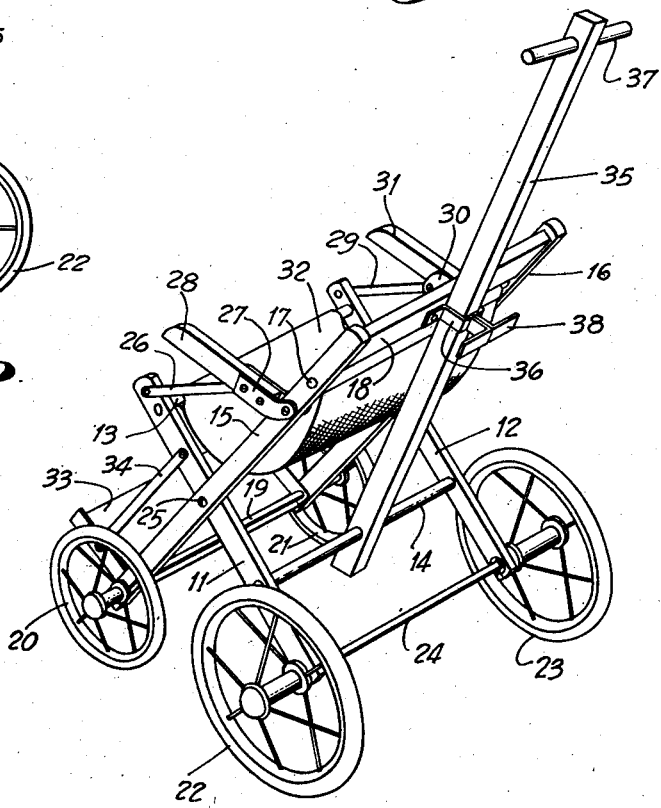
Inventor:
DOUGLAS R. WINSLOW,
By John H. Rouse,
Attorney.

Patented May 29, 1945

2,377,198

UNITED STATES PATENT OFFICE 2,377,198

CHILD'S FOLDING VEHICLE

Douglas R. Winslow, Glendale, Calif.

Application November 11, 1944, Serial No. 563,006

2 Claims. (Cl. 280—41)

This invention relates to improvements in children's vehicles of the type having a seat for the child. Such vehicles are usually foldable for convenience of transportation in an automobile or public conveyance, and for storage when not in use. In connection with vehicles of this character, the use of both hands is usually required to first release catches and then fold the vehicle. Such procedure is especially difficult when the child occupying the vehicle is of an age at which it must be held in the arms. It is therefore a main object of this invention to avoid such difficulty by providing a vehicle which folds automatically when lifted by one hand, and yet is safe in normal use.

Another object is to provide a child's wheeled vehicle, of the character described in the preceding object, wherein the novel feature resides in the combination with a generally-conventional structure of a pair of simple cooperating elements.

Other objects and advantages of the invention will be found in the description, the drawing, and the claims; and for full understanding of the invention, reference is to be had to the following detailed description and accompanying drawing, wherein:

Figure 1 is a perspective view of a vehicle embodying the invention, the view being taken generally from the rear; and Figure 2 is a side elevation, in reduced scale, of the vehicle shown in Fig. 1 and as it appears when folded.

Referring first more particularly to Fig. 1 of the drawing, the numerals 11 and 12 indicate a pair of parallel side arms which, together with transverse spacers or rods 13 and 14, form one of a pair of frames of the vehicle. The other frame comprises a pair of parallel side arms 15 and 16 spaced apart at their upper ends by a rod 17 and a strip 18, and at their lower ends by a shaft 19, on the outer ends of which shaft is mounted a pair of wheels 20 and 21. At the rear of the vehicle is another pair of wheels 22, 23 mounted on a shaft 24 which joins the bottom ends of the arms 11 and 12.

The frames, which are preferably of wooden construction, are pivoted together at points intermediate the ends of the arms 11, 15 and 12, 16, as indicated by the bolt 25. A strap 26 is pivoted at one end to the top of arm 11 and at its other end to a bracket 27 which in turn is pivoted to an upper portion of arm 15; the bracket serving to support an arm-rest 28. At the other side of the vehicle is a similar arrangement comprising a strap 29, a bracket 30 and an arm-rest 31. By the arrangements just described the pivotal movement of the frames is limited when the vehicle is unfolded. As seen in Fig. 1, the rear ends of the arm-rests abut the side arms 15—16 and hold the brackets out of alignment with the straps so that those parts do not impede folding movement of the frames.

Attached at its ends to the rods 13 and 17 is a seat 32 of flexible material, such as canvas. At the front of the vehicle is a platform or foot-rest 33 which is pivotally mounted on the wheel-shaft 19 and connected by straps 34 to the front portions of arms 11—12.

At the rear of the vehicle is an elongated member 35 which is pivoted at its lower end on the rod 14 and extends upwardly through a U-strap 36 secured to the back of the strip 18, the member having at its top a handle 37 whereby the vehicle is propelled or pushed.

Extending from the back of the U-strap 36, conveniently integral therewith, is another handle 38. When the vehicle is lifted by means of this handle the vehicle folds automatically and the parts assume the positions shown in Fig. 2; the member 35 sliding within the U-strap 36 in this movement. The frames are so freely pivoted together and otherwise unrestrained from movement that the force of gravity acting on the lower rear portion of the vehicle effects folding of the vehicle when it is lifted by the handle 38.

The embodiment of my invention herein shown and described is obviously susceptible of modification without departing from the spirit of the invention, and I intend therefore to be limited only by the scope of the appended claims.

I claim as my invention:

1. A child's folding vehicle, comprising: a pair of frames each comprising a pair of parallel side arms and means extending transversely between the arms adjacent their opposite ends for spacing them apart, said frames being pivoted to each other for folding at points intermediate the ends of the arms, means so limiting the pivotal movement of the frames that they are in upstanding crossed relation when the vehicle is open, wheels supporting the bottom ends of the frames, a seat of flexible material attached to the upper spacing means of each of the frames, an elongated member pivotally connected at its lower end to the lower spacing means of one of the frames at the rear of the vehicle and extending upwardly adjacent and beyond the upper spacing means of the other of the frames, guide means on said upper spacing means of the other of the frames for normally holding said member with respect thereto and within which the member can slide when the vehicle is folded, a handle at the top of said member for propelling the vehicle, and another handle attached to said upper spacing means of the other of the frames for lifting the vehicle, the frames being so freely pivoted together and the weight of the rear lower portion of the vehicle being such that the vehicle folds automatically when it is lifted by said other of the handles.

2. A child's folding vehicle, comprising: a pair of frames each comprising a pair of parallel side arms and means extending transversely between the arms adjacent their opposite ends for spacing them apart, said frames being pivoted to each other for folding at points intermediate the ends of the arms, means so limiting the pivotal movement of the frames that they are in upstanding crossed relation when the vehicle is open, wheels supporting the bottom ends of the frames, a seat of flexible material attached to the upper spacing means of each of the frames, an elongated member pivotally connected at its lower end to the lower spacing means of one of the frames at the rear of the vehicle and extending upwardly adjacent and beyond the upper spacing means of the other of the frames, a guide element attached to said upper spacing means of the other of the frames and having an opening corresponding generally to the cross-sectional shape of said member within which the member can slide when the vehicle is folded, a handle at the top of said member for propelling the vehicle, and another handle extending from said guide element and serving as means for lifting the vehicle, the frames being so freely pivoted together and the weight of the rear lower portion of the vehicle being such that the vehicle folds automatically when it is lifted by said other of the handles.

DOUGLAS R. WINSLOW.